May 25, 1937.  R. H. STONE  2,081,156
HOSE COUPLING
Filed Jan. 5, 1933

R. H. Stone INVENTOR
BY
Thomas Howe ATTORNEY

Patented May 25, 1937

2,081,156

UNITED STATES PATENT OFFICE 2,081,156

HOSE COUPLING

R. Harry Stone, Bound Brook, N. J., assignor to Titeflex Metal Hose Co., a corporation of New Jersey Application January 5, 1933, Serial No. 650,283

6 Claims. (Cl. 285—86)

The present invention relates to the securing of metal hose to a coupling member.

It is often desirable, especially in connection with aeroplane work, to make a coupling of light weight, for instance of such metal as aluminum. It is difficult, however, and in any event most unreliable, to solder to aluminum. Also when two aluminum parts are screwed together they are liable to "seize" or become so stuck together that they cannot be separated.

The present invention has for its main object the securing of a hose or pipe to a coupling in a mechanically strong and tight manner whereby the disadvantages referred to are avoided and while it probably will find its widest use in connection with couplings comprising aluminum parts it is not limited to such use but may have wide application in other relations.

It is a further and more specific object of the invention to provide a hose or pipe connection with a coupling wherein the hose or pipe is mechanically secured to a sleeve which is mechanically secured in a coupling member and sealing the connection in a fluid tight manner.

A further and more specific object of the invention is to provide a pipe or hose connection with a coupling member wherein the hose or pipe is soldered to a brass sleeve which is mechanically secured in an aluminum coupling member and the connection sealed with solder.

Other and ancillary objects of the invention will appear hereinafter.

In the accompanying drawing which illustrates the invention—

Figure 1:
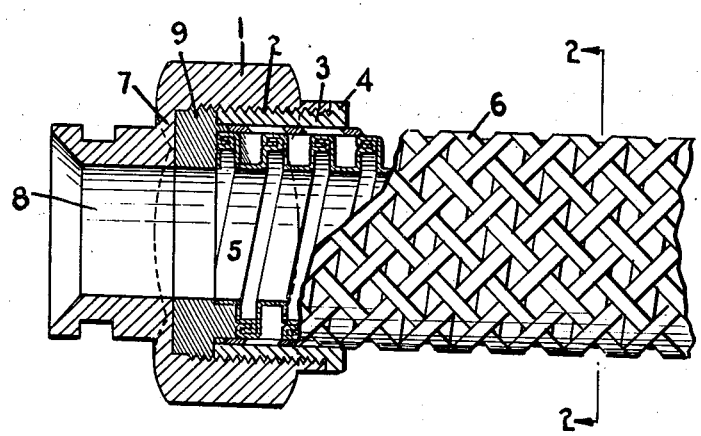
Figure 2:
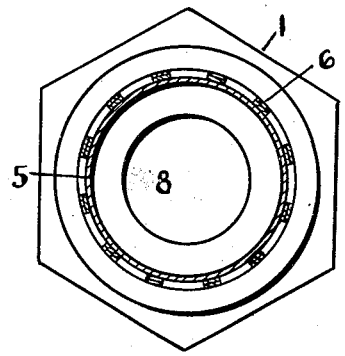

Fig. 1 is a side elevation, partly in section, of a hose and coupling member connected according to the invention; and Fig. 2 is a section on the line 2—2 of Fig. 1.

Referring to the drawing, the device comprises a coupling body member 1 of aluminum. This member may be one of the parts of a swivel coupling or of any suitable form of coupling.

The interior bore of the tubular member 1 is screw-threaded at 2 and in screw-threaded engagement therewith is the brass sleeve 3 having the threads cut upon its exterior surface and having at its outer end the outwardly extending flange 4 adapted to limit the screwing of the sleeve into the coupling member by coming against the end of the member 1. The contacting surface of the flange and the member-end are finished to fit as tightly as possible, and after the sleeve has been screwed into place the outside circumference of the flange and coupling member may be smoothly machined.

Within the bore of the sleeve 3 is inserted the end of a flexible metal conduit or hose which is secured therein by soldering or in any other suitable manner. This hose may comprise an inner corrugated tube 5 formed of a helically disposed metal (usually brass) strip having a longitudinal groove and with the edges of adjacent convolutions folded into fixed and tight relation, the flexibility being provided by bending in the corrugations. About this corrugated flexible tube is a covering or braid 6 of interwoven flat metal (usually brass) strips. The structure and advantages of such a flexible conduit are set forth more in detail in the patent to L. H. Brinkman No. 1,340,818, patented May 18, 1920, particularly with reference to Fig. 5 thereof.

The dimensions of the parts are such that when the sleeve 3 has been entered within the coupling member 1 to the fullest extent as limited by the flange 4 coming against the end of that member, there will be formed a channel between the inner end of the sleeve and the interior shoulder 7 of the coupling member. In the construction as illustrated the shoulder 7 is of sufficient heighth so that it extends inwardly to such an extent that the bore 8 of the coupling is substantially the same as the bore of the tube 5 whereby a channel is formed between the end of the tube 5, the coating 6 and the sleeve 3 on the one hand and the shoulder 7 on the other so that solder 9 filling the channel will cover the ends of the tube 5, covering 6 and sleeve 3, entering into crevices between and tightly adhering to the parts mentioned, and will also tightly fill any crevices between the brass sleeve 3 and the aluminum coupling member 1, although the solder does not ordinarily strongly mechanically adhere to the aluminum. Mechanical strength of joining of the metal hose with the coupling part being brought about by the screwthreaded relationship of the aluminum coupling part with the brass sleeve to which the flexible metal hose is secured by soldering, the soldering to the brass giving a strong mechanical connection. Any other suitable mechanically strong means of securing the brass sleeve with the aluminum coupling member may be employed as for instance the brass sleeve may be forced into the member.

A mechanically strong and absolutely fluidtight joining of the flexible metal conduit with the aluminum coupling member is thus obtained.

While the depth of the solder channel and its filling with solder will usually be such as to cause the bore inside the solder to be substantially equal to the inner bore of the flexible hose, it will be obvious that the results of a fluid tight and strong mechanical joining as desired may be accomplished by different depths of channel or of solder or both.

While the invention has been illustrated in what is considered its best application it may have other embodiments without departing from its spirit and is not therefore limited to the structure shown in the drawing.

What I claim is:

1. The combination with a coupling member having an interior shoulder, of a sleeve screw-threaded therein and a pipe secured in said sleeve, said sleeve being spaced from said shoulder to form a circumferential channel therebetween and solder in said channel.

2. The combination with a coupling member having an interior shoulder, of a sleeve screw-threaded therein and a pipe secured in said sleeve, said sleeve being spaced from said shoulder to form a circumferential channel therebetween and solder in said channel, said sleeve having a flange abutting against said coupling member when said sleeve is secured in position.

3. The combination with a coupling member having an interior shoulder, of a sleeve screw-threaded therein and a pipe secured in said sleeve, said sleeve being spaced from said shoulder to form a circumferential channel therebetween and solder in said channel extending inwardly to substantially the inner bore of the pipe.

4. The combination with an aluminum coupling member having an interior shoulder, of a brass sleeve screw-threaded within said member and having a flange adapted to abut against said member, a flexible metal hose within said sleeve and soldered thereto, the inner end of said sleeve being spaced from said shoulder when said flange is against said member whereby a circumferential channel is formed between said sleeve and said shoulder, and solder in said channel sealing, in a fluid tight manner, the connection between said hose and said member.

5. The combination with an aluminum coupling member having an interior shoulder, of a brass sleeve secured therein and a pipe secured in said sleeve, said sleeve being spaced from said shoulder to form a circumferential channel therebetween and solder in said channel.

6. The combination with an aluminum coupling member having an interior shoulder, of a brass sleeve secured therein and a pipe soldered in said sleeve, said sleeve being spaced from said shoulder to form a circumferential channel therebetween and solder in said channel and sealing said sleeve to said member.

R. HARRY STONE.